United States Patent [19]

Teindas

[11] Patent Number: 5,682,639
[45] Date of Patent: Nov. 4, 1997

[54] MOTOR VEHICLE SCREEN WIPER

[75] Inventor: Jean-Louis Teindas, Ravel, France

[73] Assignee: Valeo Systemes D'Essuyage, La Verriere, France

[21] Appl. No.: 471,414

[22] Filed: Jun. 6, 1995

[30] Foreign Application Priority Data

Jun. 8, 1994 [FR] France .................................. 94 07108

[51] Int. Cl.$^6$ .................................................. B60S 1/38
[52] U.S. Cl. .................... 15/250.46; 15/250.361; 15/250.44; 403/13; 403/65
[58] Field of Search .................. 15/250.46, 250.451, 15/250.452, 250.453, 250.454, 250.44, 250.41, 250.43, 250.4, 250.31, 250.48, 250.361; 403/13, 65

[56] References Cited

U.S. PATENT DOCUMENTS

| 3,585,672 | 6/1971 | Habert | 15/250.46 |
|---|---|---|---|
| 3,879,792 | 4/1975 | Brummer et al. | 15/250.46 |
| 4,286,351 | 9/1981 | Mower et al. | 15/250.46 |
| 4,337,547 | 7/1982 | Hancou | 15/250.46 |
| 4,675,934 | 6/1987 | Dal Palu | 15/250.46 |
| 4,909,653 | 3/1990 | Biggs | 403/24 |
| 5,073,060 | 12/1991 | Pethers | 15/250.46 |

FOREIGN PATENT DOCUMENTS

| 236061 | 9/1987 | European Pat. Off. . | |
|---|---|---|---|
| 0 281 397 | 7/1988 | European Pat. Off. . | |
| 2 499 921 | 2/1991 | France . | |
| 1090122 | 9/1960 | Germany | 15/250.46 |
| 2311293 | 9/1974 | Germany | 15/250.43 |
| 4025280 | 2/1991 | Germany . | |
| 652931 | 2/1963 | Italy | 15/250.453 |
| 2 030 850 | 4/1980 | United Kingdom . | |
| 2103075 | 2/1983 | United Kingdom | 15/250.46 |

*Primary Examiner*—Gary K. Graham
*Attorney, Agent, or Firm*—Morgan & Finnegan, LLP

[57] ABSTRACT

The invention proposes a motor vehicle screen wiper of the type comprising at least one elongate element, made of press-formed and bent sheet metal, and having, in cross section through a transverse plane, the form of an inverted U which comprises two vertical side portions joined together through a spine portion, in which, in one of the end portions of the elongate element, the spine portion has a zone of locally reduced thickness, such as to give a curvature to the external face of the elongate element in its end portion.

8 Claims, 2 Drawing Sheets

MOTOR VEHICLE SCREEN WIPER

FIELD OF THE INVENTION

The present invention relates to screen wipers for motor vehicles. The invention relates, in particular, to a screen wiper which comprises at least one elongate element made from metal plate by press forming and bending. Such an elongate element consists for example of the main yoke of the support structure that carries the wiping strip of a screen wiper blade, this main yoke having, in cross section through a transverse plane, the form of an inverted U comprising two parallel, vertical side portions joined together through a central web or spine portion.

BACKGROUND OF THE INVENTION

One example of a screen wiper element of this type is described and shown in European patent specification No. EP 0 236 061B1. In the known design which is described and shown in that document, at least one end of the elongate element may be equipped with a sound deadening element for preventing noise. This element includes means for hooking the sound deadening element on the end of the elongate element of the screen wiper. In that design, the end portion of the elongate element is rectilinear, that is to say the spine portion is substantially flat.

In order to improve the aerodynamic characteristics and the visual appearance of the elongate element, it is desirable to give the latter a convex curvature of the upper or exposed face of the spine portion, at least in the end portion of the elongate element. A design in which this curvature is obtained by bending of the end portion of the elongate element, after the component has been formed by press forming and bending, has proved to be unsatisfactory in that it makes it either difficult or impossible to fit the sound deadening element to the end of the elongate element.

DISCUSSION OF THE INVENTION

An object of the present invention is to provide a new design for an elongate element of a screen wiper, of the general type described above, which overcomes the above mentioned drawback while enabling the required curvature to be obtained.

With this objective in view and according to the invention, a motor vehicle screen wiper of the type comprising at least one elongate element of press formed and bent sheet metal, which has, in cross section through a transverse plane, the form of an inverted U comprising two vertical side portions joined together through a spine portion, is characterised in that, at one of the ends of the elongate element, the spine portion has a zone of locally reduced thickness such as to give a curvature to the outer face of the elongate element in the associated end portion of the latter.

According to a preferred feature of the invention the internal face of the spine portion is flat in the end portion.

In one embodiment of the invention, the zone of locally reduced thickness is formed by a coining operation during the operation of press forming the elongate element.

Preferably, the transverse terminal edge of the spine portion includes a lug for hooking engagement with a sound deadening element.

In this connection, according to a preferred feature of the invention the screen wiper includes a sound deadening element arranged at the end of the elongate element and within the latter.

The sound deadening element preferably comprises a body portion which is arranged to be inserted into the interior of the elongate element, and which has an external form which matches the internal form of the elongate element, and comprises a terminal portion which extends the elongate element longitudinally, the external shape of the terminal portion being complementary to the external shape of the elongate element in the end portion of the latter.

In the end portion, the side portions are preferably formed with notches which receive complementary portions of the sound deadening element.

The exposed terminal portion of the sound deadening element, extending outside the elongate element, is either open, so as to define an aperture through it, or is closed and profiled.

The elongate element may typically be a main yoke of a screen wiper blade.

Further features and advantages of the invention will appear more clearly on a reading of the detailed description which follows, which is given by way of example and with reference to the accompanying drawings.

DESCRIPTION OF PREFERRED EMBODIMENTS OF THE INVENTION

Figure 1:
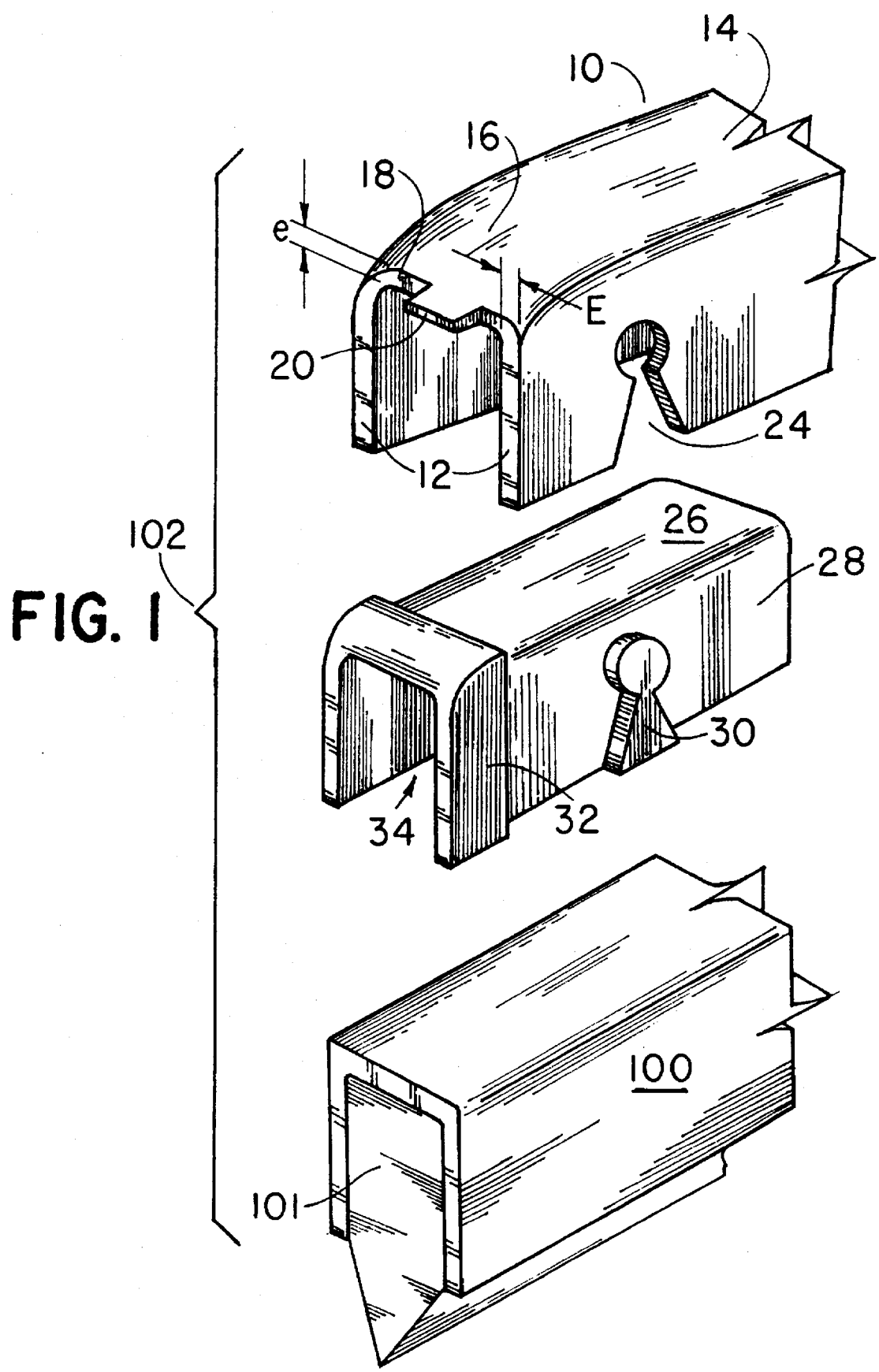
FIG. 1 is a diagrammatic perspective view showing a first embodiment of the invention, and illustrating the end portion of a main yoke of a screen wiper blade, together with an associated sound deadening element.

The elongate element or end portion 10 of a main yoke of a screen wiper blade 102, which is shown in FIG. 1, has a transverse cross section which is in the general form of an inverted U. It comprises two parallel and vertical side portions 12 which are joined together through a spine portion 14 at the top. This main yoke is an elongate element, the main body of which, having the above mentioned cross section and shown in part on the right hand side of FIG. 1, is made from a sheet metal blank having a substantially uniform thickness corresponding to the thickness E of the side portions 12. This thickness E is uniform over the whole length of the side portions, including those parts of the latter in the end portion 10 of the element, seen on the left hand side of FIG. 1.

In the end portion 10 of the finished, U-shaped, main yoke, the thickness e of the spine portion 14 is however less than the thickness E, so as to give the top face 16 of the spine portion 14 a convex curvature.

The free terminal edge 18 of the spine portion 14 is extended by a lug 20, on which a sound deadening element 22 is hooked. The means whereby the sound deadening element is hooked on to the end portion 10 of the main yoke also include notches 24 which are formed symmetrically with each other in the two side portions 12, in the end portion 10 of the yoke.

European patent specification No. EP 0 236 061B1 discloses various examples of a known design in which the sound deadening element is a component which is moulded in a plastics material, and which consists essentially of a body portion 26, the external shape of which is that of a rectangular parallelepiped. The body portion 26 is arranged to match the internal shape of the end portion 10 of the elongate element that receives the body portion 26 within it.

The side faces 28 of the body portion 26 include relief portions 30, the contours of which are complementary to the notches 24 formed in the side portions 12 of the elongate element. This enables the sound deadening element to be located in position, in cooperation with the lug 20 which is received in a complementary slot (not shown), the latter being formed in an edge of a terminal flange portion 32 of the sound deadening element. In the fitted position, this flange portion 32 projects beyond the elongate element 10, so as to form an extension of the latter. In order to complete the aerodynamic profile of the assembly, the external shape of the terminal flange portion 32 is complementary to the external shape of the end portion 10 of the elongate element.

In the embodiment shown in FIG. 1, the terminal flange portion 32 of the sound deadening element defines an aperture 34 having a rectangular cross section, which is arranged for example so that a branch of a second yoke (100) of the support structure for the wiping strip 101 of the screen wiper blade, which is articulated within the sound deadening element in a known way, can be received in the aperture 34. The sound deadening element has the further function of articulating the secondary yoke on the main yoke, and retaining it in position.

Figure 2:
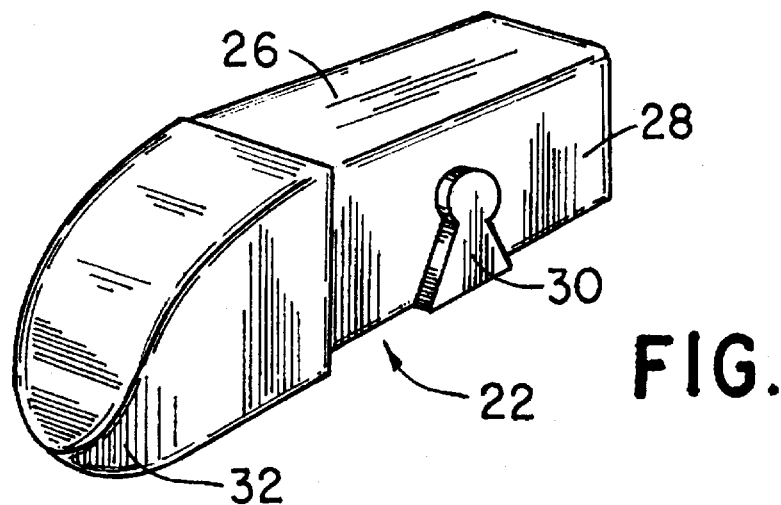
FIG. 2 shows a modified embodiment of the sound deadening element shown in FIG. 1.
Figure 3:
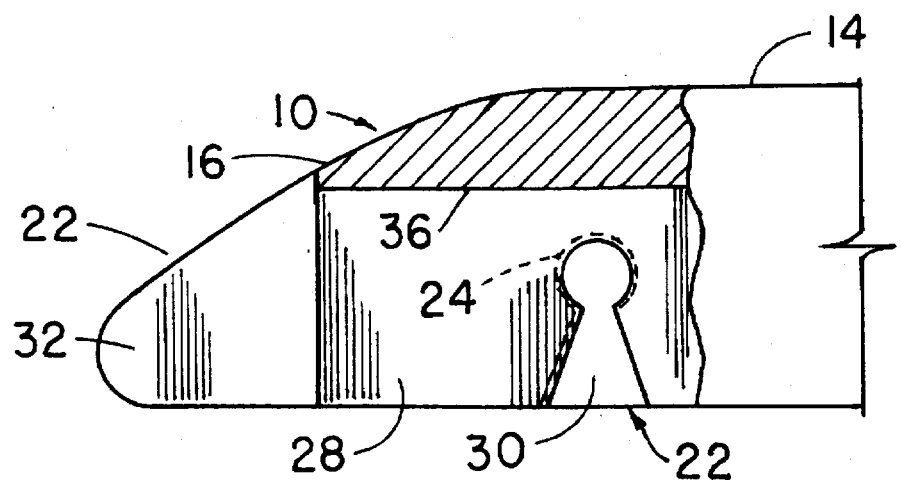
FIG. 3 is a diagrammatic side view, showing in elevation the end portion of the main yoke associated with the sound deadening element which is shown in FIG. 2.

Referring now to FIGS. 2 and 3, in this modified embodiment the sound deadening element 22 projects beyond the end portion 10 of the elongate element, and has a closed, profiled terminal portion 32. As can be seen in FIG. 3, the end portion 10 of the elongate element, extended by the terminal portion 32 of the sound deadening element 22, is profiled in its top face 16, so that the latter has a convex curvature. FIG. 3 also shows that the inner face 36 of the spine portion 14, within the terminal zone, retains a substantially flat form, so as not to interfere with the adaptability and ease of fitting of the sound deadening element 22. Thus in the end portion 10, the thickness of the spine portion 14 is locally reduced so as to give the curved face 16.

Figure 4:
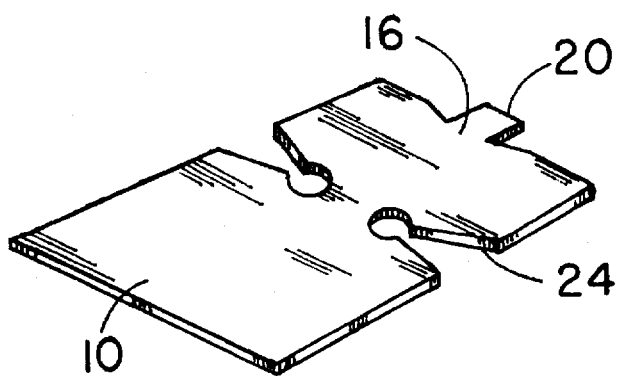
FIG. 4 is a diagrammatic view of the partly-completed end portion of the press formed elongate element shown in FIG. 1, after its thickness has been locally reduced but before being bent to shape.

With reference now to FIG. 4, this shows diagrammatically the locally thinned, or coined, portion, having the reduced thickness e, of the spine portion 14 of the elongate element, before the latter is completed by bending to form the side portions 12. This locally thinned portion, indicated generally at 16, is obtained by a local press forming operation on a zone bounded by the phantom line in FIG. 4. For this purpose a tool is used which performs a coining operation, to reduce the local thickness, simultaneously with the operation of press-forming the profiled member shown in FIG. 4 from the flat blank.

What is claimed is:

1. A screen wiper main yoke for a motor vehicle screen wiper assembly comprising an elongate element having a transverse U shape, the transverse U shape defining two transversely spaced side portions each of said side portions having a predetermined thickness and a spine portion having an outer face and joining the side portions together, the elongate element having an end portion in which the spine portion defines a zone of thickness that is less than one of the respective side portion thicknesses, said spine portion zone establishing an outer face of the spine portion that is curved convexly in the direction of elongation of the element, said spine portion having a transverse terminal edge in the end portion, the terminal edge having an integral lug for hooking engagement with a sound deadening element.

2. A screen wiper main yoke according to claim 1, wherein the spine portion has a substantially flat inner face in the end portion.

3. A screen wiper main yoke according to claim 1, wherein the reduction in thickness for the spine portion zone thickness is formed by a coining operation.

4. A screen wiper main yoke according to claim 1, further including a sound deadening element mounted within the elongate element at the end portion thereof.

5. A screen wiper main yoke according to claim 4, wherein the elongate element has an external convex curvature form, the sound deadening element has a body portion mounted within the elongate element, the sound deadening element having an external form that matches the elongate element in which the sound deadening element is mounted, the sound deadening element having a terminal portion constituting a longitudinal extension of the elongate element, the terminal portion of the sound deadening element being complementary to the external convex curvature form of the elongate element in the end portion of the elongate element.

6. A screen wiper main yoke according to claim 4, wherein the side portions of the elongate element in the end portion thereof define notches, the sound deadening element having projecting portions matching the notches and received therein.

7. A screen wiper main yoke according to claim 1, wherein the elongate element is a main yoke of a screen wiper blade.

8. A main yoke for a motor vehicle screen wiper assembly, said yoke comprising an elongated element having in transverse cross section a U-shape, the U-shape defining two transversely spaced side portions, each of said side portions having a predetermined thickness and a spine portion having an outer face and joining the side portions together, the elongate element having an end portion in which the spine portion defines a zone of thickness that is less than one of the respective side portion thicknesesss, said spine portion zone establishes an outer face of the spine portion that is curved convexly in the direction of elongation of the element, a sound deadening element having a body portion mounted within the elongate element at the end portion thereof, the sound deadening element having an external form that matches the elongate element in which the sound deadening element is mounted, the sound deadening element having a terminal portion constituting a longitudinal extension of the elongate element, the terminal portion of the sound deadening element being complementary to the external convex curvature form of the elongate element in the end portion of the elongate element and said terminal portion having a terminal flange portion defining an aperture through it.

* * * * *